United States Patent
Geaghan et al.

(10) Patent No.: US 8,089,474 B2
(45) Date of Patent: Jan. 3, 2012

(54) LOCATION SENSING SYSTEM AND METHOD EMPLOYING ADAPTIVE DRIVE SIGNAL ADJUSTMENT

(75) Inventors: Bernard O. Geaghan, Salem, NH (US); Albert H. Libbey, Eliot, ME (US)

(73) Assignee: 3M Innovative Properties Company, Saint Paul, MN (US)

( * ) Notice: Subject to any disclaimer, the term of this patent is extended or adjusted under 35 U.S.C. 154(b) by 1240 days.

(21) Appl. No.: 11/617,337

(22) Filed: Dec. 28, 2006

(65) Prior Publication Data

US 2008/0158165 A1     Jul. 3, 2008

(51) Int. Cl.
  G06F 3/045     (2006.01)
  G06F 3/041     (2006.01)
  G06F 3/046     (2006.01)

(52) U.S. Cl. ............ 345/174; 345/179; 178/18.01; 178/18.07; 178/19.01; 178/18.03

(58) Field of Classification Search .......... 345/179, 345/156, 173–174; 178/18.01, 18.03, 18.07, 178/19.01

See application file for complete search history.

(56) References Cited

U.S. PATENT DOCUMENTS

| | | |
|---|---|---|
| 3,072,849 A | 1/1963 | Firestone |
| 3,617,922 A | 11/1971 | Bernstein |
| 3,983,322 A | 9/1976 | Rodgers |
| 4,029,869 A | 6/1977 | Ingram et al. |
| 4,289,926 A | 9/1981 | Kobayashi |
| 4,289,927 A | 9/1981 | Rodgers |
| 4,353,552 A | 10/1982 | Pepper |
| 4,360,790 A | 11/1982 | Heise |
| 4,455,451 A | 6/1984 | Kriz |
| 4,473,717 A | 9/1984 | Parnell et al. |
| 4,672,154 A | 6/1987 | Rodgers et al. |
| 4,686,332 A | 8/1987 | Greanias et al. |
| 4,786,765 A | 11/1988 | Yamanami et al. |
| 4,848,496 A | 7/1989 | Murakami et al. |
| 4,878,553 A | 11/1989 | Yamanami et al. |
| 4,893,115 A | 1/1990 | Blanchard |
| 4,902,858 A | 2/1990 | Yamanami et al. |

(Continued)

FOREIGN PATENT DOCUMENTS

CN     1512345     7/2004

(Continued)

OTHER PUBLICATIONS

U.S. Appl. No. 11/557,829, entitled "Touch Location Sensing System and Method Employing Sensor Data Fitting to a Predefined Curve," filed on Nov. 8, 2006.

(Continued)

Primary Examiner — Lun-Yi Lao
Assistant Examiner — Jarurat Suteerwongsa
(74) Attorney, Agent, or Firm — Steven A. Bern (57) ABSTRACT

Systems and methods provide for adaptive drive signal adjustment to improve reception of a stylus signal at a location sensor. A location sensing system includes an untethered stylus comprising circuitry configured to receive a drive signal and transmit a stylus signal. The circuitry is configured to be energized by the received drive signal and includes frequency-sensitive circuitry. A location sensor includes a controller and a sensing array. The location sensor is configured to generate the drive signal and receive the stylus signal. The controller is configured to adjust a parameter of the drive signal that improves receptivity of the stylus signal by the location sensor.

28 Claims, 6 Drawing Sheets

U.S. PATENT DOCUMENTS

| | | |
|---|---|---|
| 4,948,926 A | 8/1990 | Murakami et al. |
| 4,956,526 A | 9/1990 | Murakami et al. |
| 4,988,837 A | 1/1991 | Murakami et al. |
| 4,999,461 A | 3/1991 | Murakami et al. |
| 5,028,745 A | 7/1991 | Yamanami et al. |
| RE33,740 E | 11/1991 | Taguchi et al. |
| RE33,805 E | 1/1992 | Yamanami et al. |
| 5,083,118 A | 1/1992 | Kazama |
| 5,122,623 A | 6/1992 | Zank et al. |
| 5,130,500 A | 7/1992 | Murakami et al. |
| 5,138,118 A | 8/1992 | Russell |
| RE34,187 E | 3/1993 | Yamanami et al. |
| 5,191,175 A | 3/1993 | Protheroe et al. |
| 5,194,819 A | 3/1993 | Briefer |
| 5,218,173 A | 6/1993 | Garwin et al. |
| 5,218,174 A | 6/1993 | Gray et al. |
| 5,305,017 A | 4/1994 | Gerpheide |
| 5,337,040 A | 8/1994 | Kind |
| 5,369,227 A | 11/1994 | Stone |
| 5,373,118 A | 12/1994 | Watson |
| 5,374,787 A | 12/1994 | Miller |
| 5,381,137 A | 1/1995 | Ghaem et al. |
| 5,402,151 A | 3/1995 | Duwaer |
| 5,414,227 A | 5/1995 | Schubert et al. |
| 5,420,379 A | 5/1995 | Zank et al. |
| 5,420,804 A | 5/1995 | Tanaka et al. |
| 5,475,401 A | 12/1995 | Verrier et al. |
| 5,486,847 A | 1/1996 | Ranf et al. |
| 5,506,375 A | 4/1996 | Kikuchi |
| 5,528,002 A | 6/1996 | Katabami |
| 5,530,210 A | 6/1996 | Fukuzaki |
| 5,557,076 A | 9/1996 | Wieczorek et al. |
| 5,565,658 A | 10/1996 | Gerpheide et al. |
| 5,571,997 A | 11/1996 | Gray et al. |
| 5,594,215 A | 1/1997 | Jeng |
| 5,608,390 A | 3/1997 | Gasparik |
| 5,619,431 A | 4/1997 | Oda |
| 5,629,500 A | 5/1997 | Fukuzaki et al. |
| 5,633,471 A | 5/1997 | Fukushima |
| 5,644,108 A | 7/1997 | Katsurahira et al. |
| 5,661,269 A * | 8/1997 | Fukuzaki et al. ........... 178/19.06 |
| 5,675,130 A | 10/1997 | Sekizawa |
| 5,682,019 A | 10/1997 | Katsurahira et al. |
| 5,691,512 A | 11/1997 | Obi |
| 5,691,513 A | 11/1997 | Yamamoto et al. |
| 5,693,914 A | 12/1997 | Ogawa |
| 5,706,000 A | 1/1998 | Fukuzaki et al. |
| 5,714,984 A | 2/1998 | Fukuzaki et al. |
| 5,730,165 A | 3/1998 | Philipp |
| 5,748,110 A | 5/1998 | Sekizawa et al. |
| 5,751,229 A | 5/1998 | Funahashi |
| 5,763,839 A | 6/1998 | Funahashi et al. |
| 5,790,106 A | 8/1998 | Hirano |
| 5,792,997 A | 8/1998 | Fukuzaki |
| 5,793,360 A | 8/1998 | Fleck et al. |
| 5,815,091 A | 9/1998 | Dames et al. |
| 5,861,583 A | 1/1999 | Schediwy et al. |
| 5,898,136 A | 4/1999 | Katsurahira |
| 5,914,708 A * | 6/1999 | LaGrange et al. ............ 345/179 |
| 5,914,710 A | 6/1999 | Chen et al. |
| 5,945,980 A * | 8/1999 | Moissev et al. ............... 345/173 |
| 5,973,677 A | 10/1999 | Gibbons |
| 5,986,646 A * | 11/1999 | Chen et al. ................... 345/173 |
| 6,002,387 A | 12/1999 | Ronkka et al. |
| 6,005,555 A | 12/1999 | Katsurahira et al. |
| 6,020,849 A | 2/2000 | Fukuzaki |
| 6,064,374 A | 5/2000 | Fukuzaki |
| 6,075,468 A | 6/2000 | Sugiyama |
| 6,118,435 A | 9/2000 | Fujita et al. |
| 6,133,906 A | 10/2000 | Geaghan |
| 6,137,427 A | 10/2000 | Binstead |
| 6,178,818 B1 | 1/2001 | Plöchinger |
| 6,215,476 B1 * | 4/2001 | Depew et al. ................. 345/173 |
| 6,249,234 B1 | 6/2001 | Ely et al. |
| 6,307,385 B1 | 10/2001 | Tardif et al. |
| 6,335,727 B1 | 1/2002 | Morishita et al. |
| 6,380,931 B1 | 4/2002 | Gillespie et al. |
| 6,433,781 B1 | 8/2002 | Oda et al. |
| 6,466,036 B1 | 10/2002 | Philipp |
| 6,476,799 B1 * | 11/2002 | Lee et al. ..................... 345/174 |
| 6,546,107 B1 | 4/2003 | Bohnke |
| 6,549,096 B2 | 4/2003 | Groves et al. |
| 6,576,850 B2 | 6/2003 | Fukushima et al. |
| 6,587,098 B2 | 7/2003 | Teterwak |
| RE38,286 E | 10/2003 | Flowers |
| 6,667,740 B2 | 12/2003 | Ely et al. |
| 6,670,561 B2 | 12/2003 | Aoki |
| 6,690,156 B1 | 2/2004 | Weiner et al. |
| 6,762,752 B2 | 7/2004 | Perski et al. |
| 6,790,160 B2 | 9/2004 | Kato et al. |
| 6,927,762 B2 | 8/2005 | Lin |
| 6,970,160 B2 | 11/2005 | Mulligan et al. |
| 7,019,672 B2 | 3/2006 | Ely |
| 7,030,782 B2 | 4/2006 | Ely et al. |
| 7,079,118 B2 | 7/2006 | Benard et al. |
| 7,241,954 B2 | 7/2007 | Kanai |
| 7,265,303 B2 | 9/2007 | Thacker |
| 7,411,584 B2 | 8/2008 | Hill et al. |
| 7,436,164 B2 | 10/2008 | Vos |
| 7,449,895 B2 | 11/2008 | Ely et al. |
| 7,453,444 B2 | 11/2008 | Geaghan |
| 7,474,300 B2 | 1/2009 | Katsurahira et al. |
| 7,787,259 B2 | 8/2010 | Free et al. |
| 7,812,268 B2 | 10/2010 | Ely |
| 7,907,130 B2 | 3/2011 | Ely |
| 2002/0050983 A1 * | 5/2002 | Liu et al. ...................... 345/173 |
| 2003/0001692 A1 | 1/2003 | Chiu et al. |
| 2003/0067447 A1 | 4/2003 | Geaghan et al. |
| 2003/0090347 A1 | 5/2003 | Losehand et al. |
| 2004/0004488 A1 | 1/2004 | Baxter |
| 2004/0092229 A1 | 5/2004 | Hessel |
| 2004/0095333 A1 * | 5/2004 | Morag et al. .................. 345/173 |
| 2004/0104826 A1 | 6/2004 | Philipp |
| 2004/0155871 A1 | 8/2004 | Perski et al. |
| 2004/0233178 A1 | 11/2004 | Silk et al. |
| 2005/0083307 A1 | 4/2005 | Aufderheide et al. |
| 2005/0099188 A1 | 5/2005 | Baxter |
| 2005/0128191 A1 | 6/2005 | Katsurahira et al. |
| 2005/0146513 A1 | 7/2005 | Hill et al. |
| 2005/0162411 A1 | 7/2005 | Berkel van |
| 2005/0171714 A1 | 8/2005 | Ely et al. |
| 2005/0174259 A1 | 8/2005 | Ely |
| 2006/0016800 A1 | 1/2006 | Paradiso et al. |
| 2006/0022959 A1 | 2/2006 | Geaghan |
| 2006/0038628 A1 | 2/2006 | Khannur |
| 2006/0114247 A1 | 6/2006 | Brown |
| 2006/0125472 A1 | 6/2006 | Howard et al. |
| 2007/0164833 A1 | 7/2007 | Kottschlag |
| 2008/0106520 A1 | 5/2008 | Free et al. |
| 2008/0116990 A1 | 5/2008 | Rokhsaz |
| 2008/0128180 A1 | 6/2008 | Perski et al. |
| 2008/0142281 A1 | 6/2008 | Geaghan |
| 2008/0149401 A1 | 6/2008 | Hagen et al. |
| 2008/0149402 A1 | 6/2008 | Vos |
| 2008/0150550 A1 | 6/2008 | Vos |
| 2008/0150658 A1 | 6/2008 | Vos |
| 2008/0150917 A1 | 6/2008 | Libbey et al. |
| 2008/0150918 A1 | 6/2008 | Hagen et al. |
| 2008/0156546 A1 | 7/2008 | Hauck |
| 2009/0040193 A1 | 2/2009 | Geaghan |
| 2009/0134960 A1 | 5/2009 | Larson et al. |
| 2010/0188832 A1 | 7/2010 | Free et al. |

FOREIGN PATENT DOCUMENTS

| | | |
|---|---|---|
| DE | 33 42 522 | 6/1985 |
| DE | 298 19 250 | 1/2000 |
| EP | 0 549 956 A1 | 7/1993 |
| EP | 0 607 694 81 | 3/2000 |
| JP | 59-014043 | 1/1984 |
| JP | 07-319601 | 12/1995 |
| JP | 08-179871 | 7/1996 |
| JP | 09-046135 | 2/1997 |
| JP | 10-011206 | 1/1998 |
| JP | 11-024830 | 1/1999 |
| JP | 11-073270 | 3/1999 |
| JP | 11-249798 | 9/1999 |
| JP | 2002-007054 | 1/2002 |

| | | |
|---|---|---|
| JP | 2002-297300 | 10/2002 |
| JP | 2004-062729 | 2/2004 |
| JP | 2004-185153 | 7/2004 |
| KR | 10-0601151 B1 | 7/2006 |
| KR | 10-0601152 B1 | 7/2006 |
| WO | WO 92/08206 | 5/1992 |
| WO | WO 93/08551 | 4/1993 |
| WO | WO 96/18171 | 6/1996 |
| WO | WO 02/103622 A2 | 12/2002 |
| WO | WO 2004/021328 A2 | 3/2004 |
| WO | WO 2004/036147 A2 | 4/2004 |
| WO | WO 2004/040240 A1 | 5/2004 |
| WO | WO 2004/070396 A2 | 8/2004 |
| WO | WO 2006/133159 A2 | 12/2006 |

OTHER PUBLICATIONS

U.S. Appl. No. 11/613,571, entitled "Oscillator Circuit for Use in an Untethered Stylus" and filed on Dec. 20, 2006.

Paul Lorrain and Dale Corson, *Electromagnetic Fields and Waves*, 2d ed. W.H. Freeman and Company of San Francisco, CA (1970), pp. 150-152.

* cited by examiner

LOCATION SENSING SYSTEM AND METHOD EMPLOYING ADAPTIVE DRIVE SIGNAL ADJUSTMENT

The present invention relates generally to location sensing systems and methods and, more particularly, to location sensing systems and methods that employ an untethered stylus as a user input implement.

BACKGROUND

Personal computing systems of varying type and configuration typically provide one or more user interface devices to facilitate user interaction with such computing systems. Well known user interface devices include a keyboard, mouse, trackball, joystick, and the like. Various types of personal computing devices, such as tablet PCs, provide a pen apparatus that can be manipulated by the user, much in the same way as a pencil or ink pen.

Conventional computing devices that provide for user input via a pen or other pointer implement typically employ an electromagnetic inductive system. The electromagnetic inductive system usually comprises an electromagnetic pen or pointer apparatus and a digitizer in the form of a tablet. Changes in pen location relative to the digitizer's sensing surface are detected and location computations are made to determine the coordinates of the pen.

SUMMARY OF THE INVENTION

The present invention is directed to effecting communication between an untethered stylus and a location sensing device. Embodiments of the present invention are directed to a system that provides for adaptive drive signal adjustment to improve reception of a stylus signal at a location sensor.

According to embodiments of the present invention, a location sensing system includes an untethered stylus comprising circuitry configured to receive a drive signal and transmit a stylus signal. The circuitry is configured to be energized by the received drive signal and includes frequency-sensitive circuitry. A location sensor includes a controller and a sensing array, such as an electromagnetic or field sensing array. The location sensor is configured to generate the drive signal and receive the stylus signal. The controller is configured to adjust a parameter of the drive signal that improves receptivity of the stylus signal by the location sensor.

The controller may be configured to adjust a parameter of the drive signal that increases a magnitude of the stylus signal, modifies a phase of the stylus signal, or increases a signal-to-noise ratio of the stylus signal, for example. The controller may be configured to measure a parameter of the stylus signal as the drive signal parameter is adjusted over a range of parameter values. For example, the stylus signal parameter subject to measurement may be a magnitude of the stylus signal or a phase of the stylus signal. The controller may be configured, for example, to adjust a frequency of the drive signal to match a resonance frequency of the frequency-sensitive circuitry of the stylus. A frequency of the drive signal may be adjusted to track changes of a resonance frequency of the frequency-sensitive circuitry of the stylus.

According to one approach, the controller may be configured to adjust the frequency of the drive signal between two frequencies, such as between frequencies higher and lower than an estimated resonance frequency of the frequency-sensitive circuitry. A magnitude of the stylus signal may be determined at each of the adjusted drive signal frequencies. The drive signal frequency may be adjusted in a manner that increases the stylus signal magnitude. Also, a change in stylus proximity relative to the sensing array (e.g., array of electrodes) may be determined based on a change in absolute values of stylus signal magnitudes at both higher and lower frequencies. For example, a location of the stylus relative to the sensing array may be determined based on absolute values of stylus signal magnitudes at both higher and lower frequencies. Further, the stylus circuitry may be configured to modulate the magnitude of the stylus signals at the higher and lower frequencies in a predetermined frequency or code sequence. The controller may be further configured to demodulate the predetermined frequency or code sequence as a stylus status indication.

A resonance frequency of the frequency-sensitive circuitry of the stylus may change in accordance with a status change of the stylus. The controller may be configured to detect the change in stylus status by measuring a change of the drive signal frequency needed to match the resonance frequency of the frequency-sensitive circuitry. For example, the controller may be configured to detect the change in stylus status by measuring a rate of change of the drive signal frequency.

The stylus may be implemented to include switch circuitry coupled to the frequency-sensitive circuitry and one or more switches actuatable by a user of the stylus. A resonance frequency of the frequency-sensitive circuitry preferably changes in response to actuation of the one or more switches. The controller may be configured to adjust a frequency of the drive signal to match the changed resonance frequency of the frequency-sensitive circuitry. For example, one or more switches of the stylus may correspond to one or more of a user-initiateable function, a mouse function, a stylus pressure measurement, a stylus tip switch function, an eraser function, a gun function, and a steering function.

The location sensor may include a modulator configured to modulate the drive signal at a drive signal frequency corresponding to a resonance frequency of the frequency-sensitive circuitry of the stylus. A demodulator at the location sensor is preferably synchronized with the drive signal frequency. The controller may be configured to coordinate simultaneous transmission of the drive signal and reception of stylus signal.

In accordance with other embodiments of the present invention, methods of controlling an operating frequency of a location sensor with an untethered stylus involve receiving, at the stylus, a drive signal generated at the location sensor, energizing the stylus, and producing a signal at the stylus in response to receiving the drive signal. The stylus signal is received at the location sensor, and a parameter of the drive signal is adjusted that improves receptivity of the stylus signal at the location sensor.

Adjusting the parameter of the drive signal may increase a magnitude of the stylus signal or modify a phase of the stylus signal. Adjusting the parameter of the drive signal may increase a signal-to-noise ratio of the stylus signal.

Embodiments may further involve measuring a parameter of the stylus signal as the drive signal parameter is adjusted over a range of parameter values. The stylus signal parameter subject to measurement may include at least one of a magnitude of the stylus signal and a phase of the stylus signal. Adjusting the parameter of the drive signal may involve adjusting a frequency of the drive signal to match a resonance frequency of frequency-sensitive circuitry of the stylus, and may further involve tracking changes of a resonance frequency of frequency-sensitive circuitry of the stylus.

According to one approach, adjusting the parameter of the drive signal involves adjusting the frequency of the drive signal between two frequencies, such as between frequencies higher and lower than an estimated resonance frequency of frequency-sensitive circuitry of the stylus. A magnitude of the stylus signal at each of the adjusted drive signal frequencies may be determined, and the drive signal frequency adjusted in a manner that increases the stylus signal magnitude. Also, a change in stylus proximity relative to the location sensor may be detected based on a change in absolute values of stylus signal magnitudes at both higher and lower frequencies. For example, a location of the stylus relative to the location sensor may be determined based on absolute values of stylus signal magnitudes at both higher and lower frequencies. Further, the magnitude of the stylus signals may be modulated at the higher and lower frequencies in a predetermined frequency or code sequence. At the location sensor, the predetermined frequency or code sequence may be demodulated as a stylus status indication.

Methods may involve changing a resonance frequency of frequency-sensitive circuitry of the stylus in accordance with a status change of the stylus, and detecting, at the location sensor, the change in stylus status by measuring one or both of a change and a rate of change of the drive signal frequency needed to match the resonance frequency of the frequency-sensitive circuitry of the stylus. Transmitting the drive signal and receiving the stylus signal at the location sensor may be effected simultaneously.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF EMBODIMENTS

In the following description of the illustrated embodiments, reference is made to the accompanying drawings which form a part hereof, and in which is shown by way of illustration, various embodiments in which the invention may be practiced. It is to be understood that the embodiments may be utilized and structural changes may be made without departing from the scope of the present invention.

The present invention is generally directed to methods and systems for effecting communication between an untethered device and a location sensing system. Exemplary embodiments of the untethered device include a stylus configured for hand-held manipulation. Exemplary embodiments of the location sensing system include a device locating sensor or touch location sensor, such as a digitizer or a touch-sensitive sensor in combination with a digitizer. Other examples of untethered devices and location sensing systems include RFID tags and RFID readers, and game pieces that interact with a game board or other structure that incorporates a location sensing system. It is understood that methods and systems in accordance with the present invention may be implemented in a wide range devices and systems other than those particularly described herein.

Embodiments of the present invention provide for improved receptivity of a stylus signal by a location sensor, such as a digitizer or a touch-sensitive sensor in combination with a digitizer. According to embodiments of the present invention, a location sensor is configured to transmit drive signal to an untethered stylus which, in response, transmits a stylus signal for reception by the location sensor. The drive signal is adaptively adjusted such that the stylus signal received by the location sensor has improved receptivity characteristics.

In addition to adaptively adjusting the drive signal, the location sensor is preferably configured to detect changes in the received stylus signal indicative of stylus status and/or proximity changes. By way of example, signals transmitted to the stylus may be adaptively changed to match the characteristics (e.g., resonance frequency) of circuitry in the stylus. Changes in the stylus signal responsive to changes in the drive signal (e.g., frequency and/or rate of change of frequency) may be measured to determine the state of stylus status circuitry.

A location sensing system of the present invention may advantageously be implemented to simultaneously and continuously effect transmission of power and synchronization signal information from a location sensor to an untethered stylus while the location sensor receives status and location signal information from the untethered stylus. Implementing an adaptive drive signal adjustment methodology of the present invention provides for reduced stylus component costs and lower tolerances of such components. For example, stylus resonant circuits can be higher Q circuits, and lower in cost (e.g., lower stability components and construction).

In accordance with embodiments of the present invention, the frequency of a drive signal generated by a location sensor may be adaptively adjusted to match the resonance frequency of frequency-sensitive circuitry of an untethered stylus. For example, and as will be described in greater detail hereinbelow, the resonance frequency of frequency-sensitive circuitry of an untethered stylus may be measured by changing (e.g., dithering) the operating frequency of the drive signal and measuring resulting changes in stylus output magnitude and/ or phase. Input synchronous demodulator circuits are preferably maintained synchronous with the changing drive signal frequency.

One or more stylus switches may be configured to change the resonance frequency of the stylus circuitry. The drive signal frequency may be automatically adjusted to the new resonant point. The rate of change and degree of change in drive signal frequency indicates a change in the status of a specific switch of the stylus. For example, the stylus may include analog circuitry coupled to frequency-sensitive circuitry of the stylus and to one or more switches. A resonance frequency of the frequency-sensitive circuitry may change continuously in response to actuation of one or more of the switches, from which continuous analog data may be received by the location sensor. The data may also be binary or digital. A controller of the location sensor may adjust a frequency of the drive signal to match the changed resonance frequency of the frequency-sensitive circuitry. The location sensor may be configured for transmitting power and signals to, and receiving information from, a stylus simultaneously, which advantageously increases/maximizes signal-to-noise ratio and data transmission rates.

Frequency control and/or feedback circuitry of the stylus may also be used to convey stylus status information. For example, an oscillator circuit provided at the stylus may be configured to oscillate at a frequency corresponding to data to be communicated from the stylus. The oscillator circuit may be configured to amplitude modulate a voltage signal at the oscillator frequency. An amplitude demodulator at the location sensor may be configured to demodulate the amplitude modulated signal received from the stylus and to produce a sinusoid at the stylus oscillator frequency. A frequency demodulator at the location sensor may be configured to detect the stylus data. Various forms of amplitude modulation, for example, may be used in accordance with the present invention, preferably with separation of AM modulation frequency from adaptive frequency control bandwidth.

Figure 1:
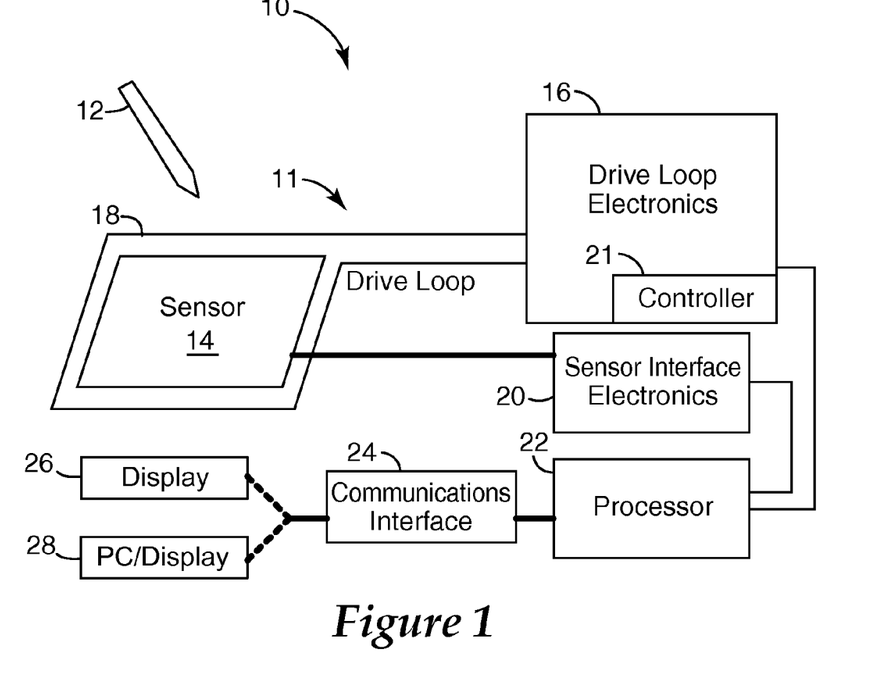
FIG. 1 is a diagram of a location sensing system that includes an untethered stylus and a location sensing device in accordance with embodiments of the present invention.

Various embodiments of a location sensing system that incorporates an adaptive drive signal adjustment methodology of the present invention are illustrated in the Figures. With reference to FIG. 1, a location sensing system 10 includes a stylus 12 that interacts with a sensing device 11. The sensing device 11 includes a location sensor 14, such as a digitizer. The stylus 12 is preferably configured as a tetherless or cordless implement that does not have a battery. Rather, the stylus 12 derives power from a magnetic field generated by the sensing device 11. Although preferred embodiments of an untethered stylus do not include a battery, some embodiments may employ a battery, such as a rechargeable battery that is recharged from energy derived from the magnetic field of the drive signal. A battery may be used to provide power to various circuits of the stylus, such as a modulator or pressure sensor (e.g., tip or eraser pressure sensor).

The sensing device 11 is shown to include a drive loop or coil 18 coupled to drive loop electronics 16 that cooperate to generate a magnetic field, which may be a continuously varying magnetic field. Drive coil 18 may comprise one or more coils or loops. The stylus 12, having derived power from the magnetic field emanating from the drive coil 18, broadcasts a signal from which stylus location and status may be determined by the sensing device 11.

The stylus 12 is preferably configured to include one or more user-actuatable buttons or switches, such as those commonly employed to implement various mouse functions (e.g., right and left mouse buttons). The tip of the stylus 12 may incorporate a pressure sensor from which applied pressure can be resolved and transmitted to the sensing device 11. Eraser functionality may also be incorporated in the form of a switch or pressure sensor at the stylus end opposite the tip. In some implementations, the stylus 12 may instead be configured as another type of device, such as a gun, joy-stick or steering wheel, for example, and may incorporate one or more switches or sensors for implementing a gun function, a joystick function or a steering wheel function. A game piece may also incorporate one or more switches for implementing various game or game piece functions.

Sensor interface electronics 20 is coupled to the sensor 14 and facilitates measurement of signals developed at the sensor 14 in response to signals broadcast by the stylus 12. According to one configuration, the sensor 14 includes a digitizer that incorporates a detection grid and electronics as is known in the art. For example, such a detection grid may include pairs of position resolving conductors each of which forms one or more differential coil elements in the sensor 14, with each conductor pair receiving a magnetic signal transmitted by the stylus 14. An illustrative example of a digitizer having such a detection grid configuration, elements of which may be employed in a location sensor system of the present invention, is disclosed in U.S. Pat. Nos. 4,786,765; 5,218,174; 5,633,471; 5,793,360; 6,667,740; and 7,019,672; which are hereby incorporated herein by reference.

According to another configuration, the sensing device 11 may incorporate a sensor 14 that effectively incorporates a digitizer and a touch-sensitive sensor. The digitizer, according to this configuration, allows the location and status of the stylus 12 to be determined. The touch-sensitive sensor allows the location of a finger touch to be determined. This configuration allows a user to use either the stylus 12 or a finger to indicate a desired location on a computer display, for example, as well as determine the location and status of the stylus 12.

The touch-sensitive sensor 14 typically includes a matrix that capacitively couples to the stylus 12 and/or a finger. In this configuration, the sensor 14 of the sensing device 11 is preferably made up of a series of transparent conductors arranged on a glass or plastic cover that can be placed in front of an LCD display. One side of the glass or plastic sheet has conductors in the X direction, and the opposite side has conductors in the Y direction. Examples of suitable touch-sensitive sensors 14 are disclosed in commonly owned U.S. Pat. Nos. 6,133,906 (Geaghan) and 6,970,160 (Mulligan et al.), in commonly owned U.S. Patent Application Publication US 2005/0083307 (Aufderheide et al.), in U.S. Pat. Nos. 6,762,752 (Perski et al.) and 6,690,156 (Weiner et al.), and in U.S. Patent Application Publication US 2004/0095333 (Morag et al.), now U.S. Pat. No. 7,292,229 (Morag et al.), each of which is hereby incorporated herein by reference.

An embodiment that incorporates a digitizer and touch-sensitive sensor advantageously allows a user to point a stylus at a computer display and have the location and status of the pointing device determined and, when a finger is used to point at the display device, allows for the determination of the location of a finger touch at the display device. The dual use aspects of this embodiment of a sensing device 11 make it particularly useful in tablet PC applications.

For example, a digitizer arrangement allows a user to use a stylus to input information, indicate operations the user wants to take, and write or draw on the display. The touch-sensitive sensor allows the user to "type" information onto a virtual keyboard on the display screen, for example. This would allow the vendor of the computing system, in which a dual touch location sensor system of the present invention is implemented, to eliminate the keyboard and the associated bulk it requires. It is understood that a digitizer and a touch-sensitive sensor need not be implemented together in all configurations, but inclusion of both sensing devices provides for enhanced user interaction with a computing system that incorporates a sensing system 10 of the present invention.

According to one illustrative embodiment, the drive coil 18 may be constructed of wire, such as 36 gauge wire, looped several times (e.g., 4 times) around the periphery of the frame of sensing device 11. In one implementation, the drive coil 18 may have an inductance of about 21 µH and an impedance of about 14 Ohms at 100 kHz. The drive coil 18 is connected to a signal generator of the drive loop electronics 16. The signal generator may be configured to produce 200 periods of a 100 kHz sine wave signal gated at 250 Hz. The signal generator may, for example, produce an output signal of 0.4 $V_{pp}$, resulting in approximately 28 mA of current that flows in the drive coil 18.

Figure 2:
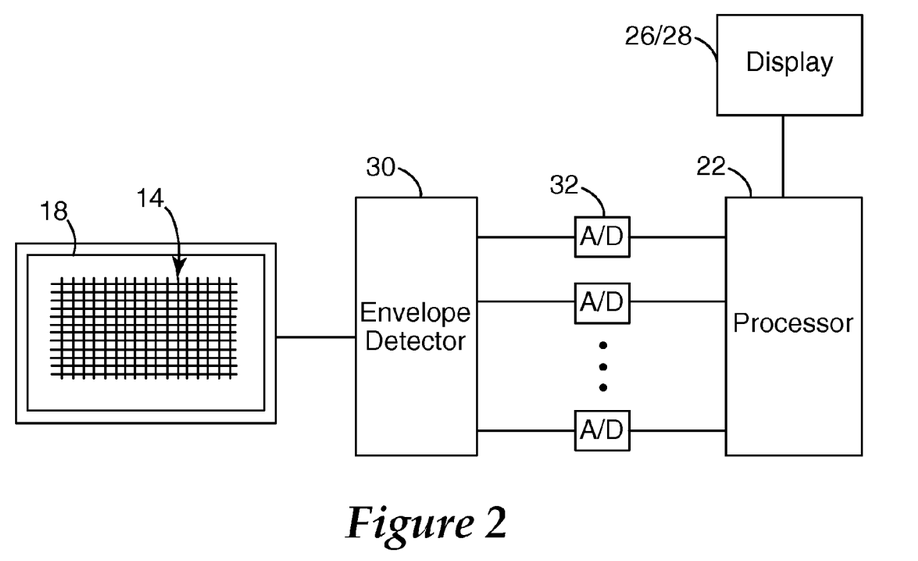
FIG. 2 is a diagram of an apparatus for generating an excitation magnetic field and adaptively adjusting a drive signal which is received by a stylus in accordance with embodiments of the present invention.

FIG. 2 is a simplified illustration of drive coil 18 and a signal generator 17 that cooperate to generate a magnetic excitation field. In this illustrative example, one or more coils are preferably arranged in the plane of the location sensor 14. A sinusoidal current is produced by the signal generator 17 with peak magnitude $A_1$ at radian frequency $\omega_1$ and is applied to the rectangular coil 18.

The stylus 12 is configured to collect energy from the magnetic field emanating from the drive coil 18 using a tank circuit. The tank circuit may initially be tuned to resonate at the frequency that the drive coil 18 is driven. In this illustrative example, the frequency is set at 100 kHz. The tank circuit of the stylus 12 builds amplitude during the burst produced by the drive coil 18 and then gradually loses signal amplitude after the drive coil 18 is turned off. The time associated with the exponential charging and discharging of the resonant tank circuit of the stylus 12 is determined by the capacitive and inductive elements in the tank circuit. Changes in the resonance frequency of the tank circuit, due to drift or purposeful modification (e.g. resulting from stylus switch state changes), are accommodated by detecting and/or tracking such changes by the sensing device 11.

FIG. 2 further shows a controller 21 coupled to the signal generator 17. Although a single signal generator 17 and drive coil arrangement is shown in FIG. 2, it is understood that multiple signal generators 17 and/or drive coil arrangements may be employed. The controller 21 is configured to adjust a parameter of the drive signal generated by the signal generator 17 that improves receptivity of the stylus signal by the location sensor, such as a digitizer.

For example, the controller 21 may be configured to adjust the frequency or frequencies of signal transmitted by the drive signal generation apparatus to the stylus such that the signals received from the stylus by the location sensor have improved or optimal parameters (e.g., increased/maximum signal magnitude, a pre-determined signal phase relative to the transmitted signal phase, and an increased/maximum signal-to-noise ratio). The signals produced by signal generator 17 may, for example, be varied by the controller 21 to increase or maximize the signal-to-noise ratio of signals received from the stylus, such as by increasing or maximizing signal magnitude or adjusting signal phase of signals received from the stylus. The controller 21 may be configured to scan the transmitted signals over a range while measuring the received signals from the stylus. One or both of magnitude and phase of the received stylus signals may be measured.

The controller 21 may adjust signals transmitted by the signal generator 17 to match the resonance frequency of frequency-sensitive circuitry of the stylus. The controller transmitted signal frequency/frequencies may provide a measurement or indication of stylus status. The controller received signal magnitude(s) may provide a measurement of indication of stylus status. A stylus switch may, for example, effect a reduction in the Q of the stylus resonant circuitry, so scanning the transmitter frequency up and down a fixed amount results in less change in stylus received signal magnitude.

Figure 3:
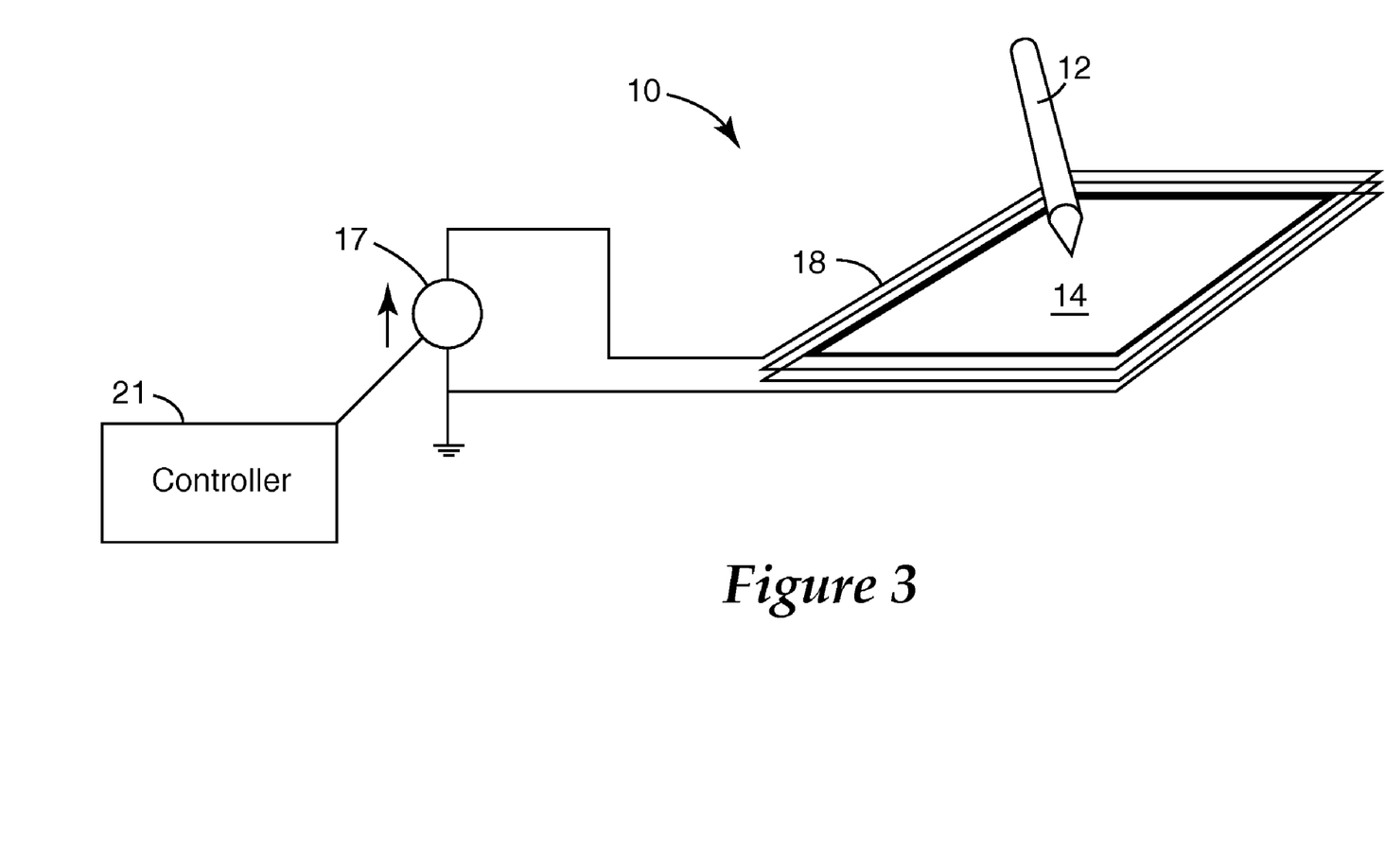
FIG. 3 is a diagram of various components of a location sensing device that cooperates with a stylus in accordance with embodiments of the present invention.

Referring again to FIG. 1, the sensor interface electronics 20 is preferably connected to the sensor 14 via a shielded connector. The sensor interface electronics 20 includes circuitry for measuring the signal levels present on the individual traces of the sensor 14, and is typically configured to reject as much noise as possible. As is shown in FIG. 3, an envelope detector circuit 30 of the sensor interface electronics 20 is configured to detect signals developed on individual traces of the sensor 14. The signals output by the envelope detector circuit 30 are digitized by use of analog-to-digital (A/D) converters 32. Each trace of the sensor 14 may have a dedicated A/D converter 32. Alternatively, two or more traces may share a common A/D converter 32 via a switch having a sufficient switching frequency.

The envelope detector circuit 30 is configured to provide sufficient gain to make the resultant signal match the requirements of A/D converters 32. The envelope detector circuit 30 may be configured to generate a signal having the same shape as an imaginary line describing the upper bound of the sensor signal. In such a configuration, the envelope detector circuit 30 effectively transforms the 100 kHz signal into a DC or low frequency signal that is more readily digitized. The envelope detector circuit 30 preferably incorporates one or more synchronous demodulators.

A processor 22 is coupled to the drive loop electronics 16, sensor interface electronics 20, and a communications interface 24, as is shown in FIG. 1. The processor 22 coordinates the operations of drive loop electronics 16, controller 21, and sensor interface electronics 20, and is configured to determine stylus/finger location and stylus status. It is understood that the structure and functions of controller 21 may be incorporated/performed by processor 22. Stylus/finger location and stylus status determinations may be made by the processor 22 using known approaches, such as those discussed in the patent references incorporated herein by reference. In one embodiment, processor 22 determines stylus/finger location and stylus status in accordance with the methodologies disclosed in commonly owned U.S. patent application Ser. No. 11/557,829, now U.S. Patent Application Publication 2008/0106520 (Free et al.), which is hereby incorporated herein by reference.

The location and status information computed by the processor 22 is communicated to a computer and/or display 26 via a communications interface 24. The communications interface 24 may be configured as an RS-232 or USB interface, for example. The processor 22 may be configured to drive a display 26 directly. Alternatively, a computer 28 may be coupled to the communications interface 24 and receive the location and status information from the processor 22, and drive its display. The processor 22 or computer 28 may be configured to control cursor velocity, momentum and other factors to enhance the user experience with the sensing system 11.

Figure 4:
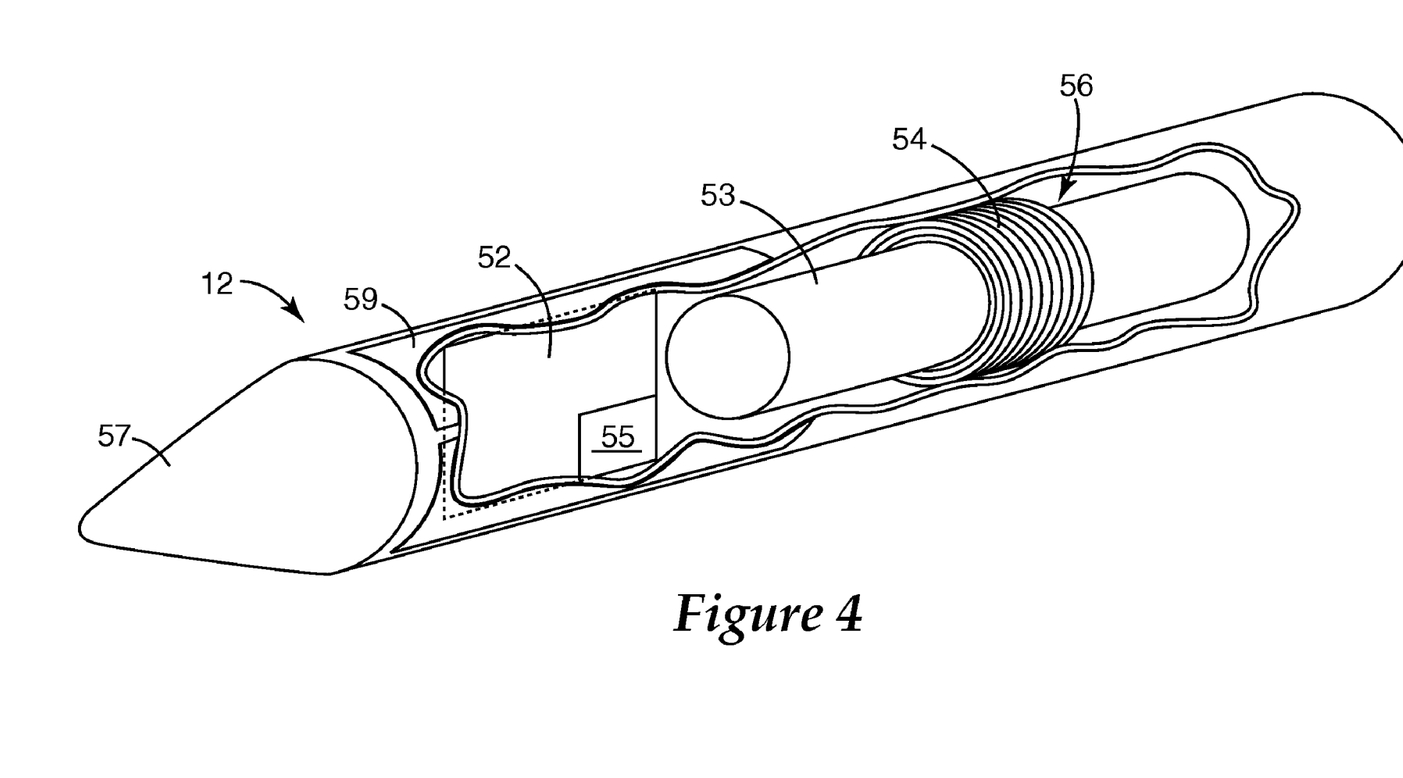
FIG. 4 is an illustration of various components of a stylus implemented in accordance with embodiments of the present invention.

Referring now to FIG. 4, there is shown an embodiment of an untethered stylus 12 of the present invention that may be implemented in the context of a location sensing system as described above or other sensing system known in the art. In accordance with the embodiment shown in FIG. 5, a stylus 12 houses electronics 52, which may include an oscillator circuit 55, and a coil 54 wrapped around a ferrite cylinder 53. The ferrite cylinder 53 serves to increase signal amplitude. An applied harmonic magnetic field produced at the surface of the location sensor (e.g., digitizer) or a display, for example, couples flux through the ferrite cylinder 53 and thus to the coil 54 when the stylus 12 is placed in the applied field.

The ferrite coil arrangement 56 resonates with a separate parallel-connected capacitor of the electronics 52 and is initially tuned to the excitation field frequency. The parallel coil-capacitor combination is connected between the stylus tip 57 and the stylus shield 59. The shield 59 may form part of, or otherwise be connected to, the stylus housing so that it can be touched, and therefore grounded, by a user's hand when held. The shield 59 may be situated to extend over the circuitry region of the stylus 12, and preferably has a discontinuous shape, such as a "C" shape, so as to avoid eddy currents that could otherwise arise in a closed loop shield arrangement.

The stylus tip 57 couples capacitively to the location sensor from which location information is derived. To provide stylus status information according to one embodiment, the ferrite coil arrangement 56 powers the electronics 52, which may include a low power oscillator or oscillators provided on oscillator circuit 55, that amplitude modulates the stylus tip voltage at the oscillator(s) frequency or frequencies. The frequency of the oscillations is changed to reflect the stylus status, such as switch closures or tip pressure changes. An exemplary low power oscillator that may be implemented in a stylus such as that shown in FIG. 4 is disclosed in commonly-owned co-pending U.S. Patent Application Publication US 2008/0150917 (Libbey et al.), which is hereby incorporated herein by reference.

Alternatively, the invention may be implemented with magnetic-sensing digitizer systems as are known in the art. An untethered magnetic stylus is similar to the capacitive stylus shown in FIG. 4, except the resonant circuit comprising ferrite coil arrangement 56 and separate parallel-connected capacitor of the electronics 52 need not be connected to tip 57 nor to a shield 59. Untethered magnetic styluses are well known in the art, and are described in previously incorporated U.S. Pat. Nos. 4,786,765; 5633471; 5793360; 6,667,740, and 7,019,672. Embodiments of the present invention that are implemented using an untethered magnetic stylus may employ a location sensor that includes multiple drive loops as disclosed in the referenced patents. In such embodiments, a separate sensing grid and separate drive loops need not used. Rather, each of the drive loop coils is alternately coupled to transmitting circuitry and then to receiving circuitry to alternately transmit and receive from one of multiple drive loop coils that are placed in the active area, typically under the display.

Figure 5:
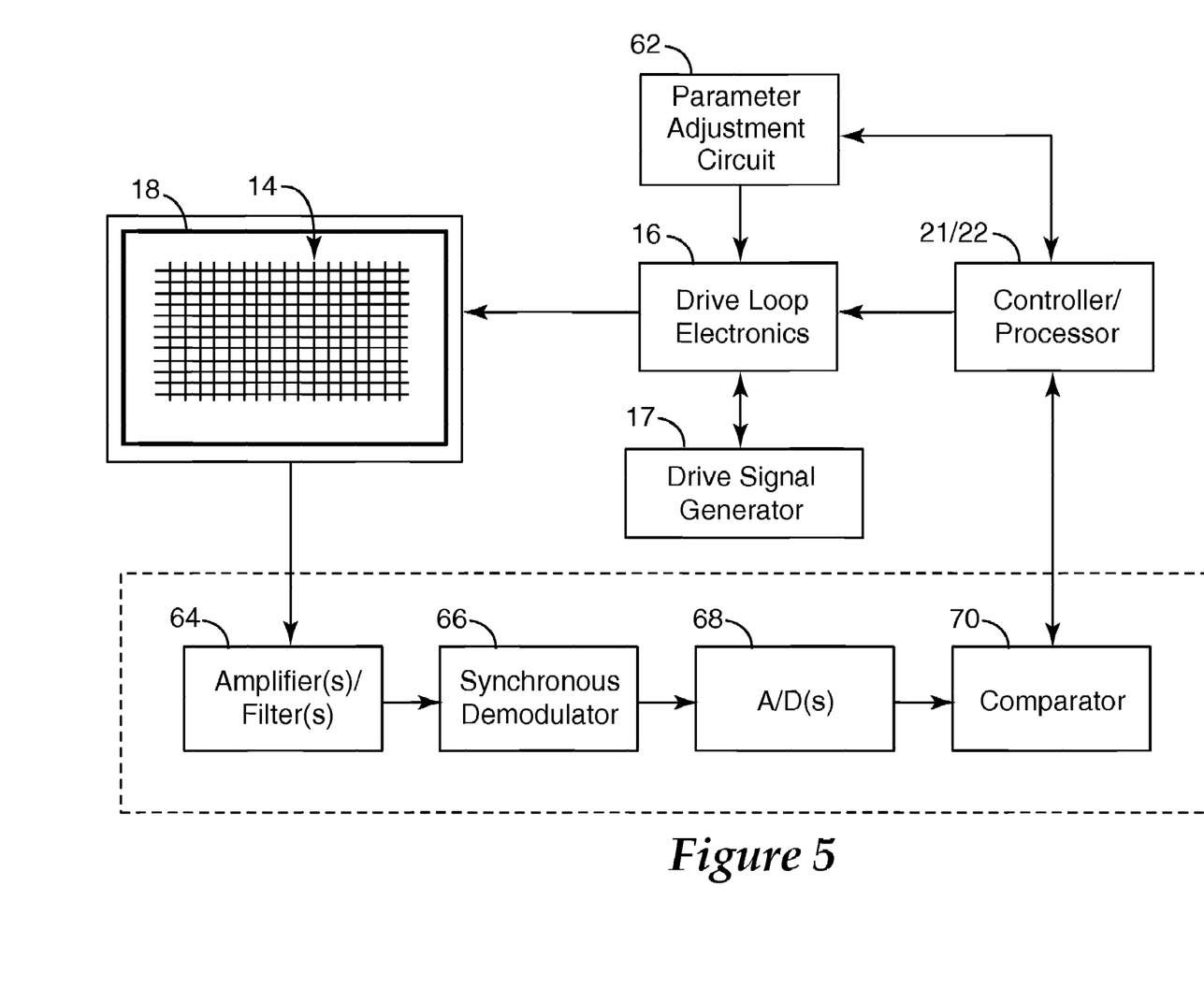
FIG. 5 is a diagram of various components of a location sensing device that cooperates with a stylus in accordance with embodiments of the present invention.

FIG. 5 illustrates additional components of a location sensor configured to implement an adaptive drive signal adjustment feature of the present invention. According to the embodiment shown in FIG. 5, a controller/processor 21/22 is coupled to, or otherwise incorporates, a parameter adjustment circuit 62. The controller/processor 21/22 and parameter adjustment circuit 62 are coupled to the drive loop electronics 16. A drive coil 18 is connected to a signal generator 17 of the drive loop electronics 16. The parameter adjustment circuit 62 is configured to adjust a parameter of a drive signal produced by the signal generator 17 that improves receptivity of a signal produced by a stylus.

The sensor interface electronics 22 of FIG. 5 is shown to include several components, including amplification and filtering circuitry 64, demodulator 66, A/D(s) 68, and comparator 70. According to one approach, stylus signal magnitude is measured at the electrodes of the location sensor 14 and processed by the sensor interface electronic circuitry shown in FIG. 5. Amplified and filtered stylus signals are processed by a demodulator 66 that is preferably synchronized to the drive frequency of the drive signal generator 17 (as is indicated by a dashed line). Demodulated stylus signals are digitized by A/D(s) 68 and input to a comparator 70. It is noted that other demodulator circuitry may be included within sensor interface electronics 22 to recover stylus status data, and that this status data may be communicated to the controller/processor 21/22, thereby bypassing the comparator 70 in the embodiment shown in FIG. 5. For example, known amplitude demodulation circuitry may be employed to detect the amplitude modulation of a received stylus signal. Known frequency demodulation circuitry may be used to detect the frequency of the amplitude modulation, such frequency indicating the state of a stylus status switch for example.

By way of example, if the stylus resonance frequency is changed, such as by activating a switch of the stylus, the drive frequency feedback control of FIG. 5 will change frequency to track the changed stylus resonant point. This change may be used to detect the change in stylus (e.g. switch) status without appreciably affecting other parameters of the stylus signal (e.g., magnitude and phase with respect to the synchronous demodulator 66). Accordingly, the stylus signal characteristics that are used for locating stylus position will not be appreciably affected by the status signal changes.

Data resulting from previous drive signal parameter adjustments are preferably stored in a memory of the controller/processor 21/22, and this data is made available to the comparator 70. The comparator 70 compares current stylus signal data with data associated with one or more stored drive signals. Based on this comparison, adjustments to a parameter(s) of the drive signal by the parameter adjustment circuit 62 are made. For example, stylus signal amplitude data associated with a previous drive signal parameter adjustment operation may be compared with signal amplitude data associated with a current drive signal parameter adjustment operation. Based on this comparison, the parameter adjustment circuit 62 may, for example, adjust a parameter of the drive signal to further increase the amplitude of the stylus signal. The comparator 70 may also compare past and present stylus signal data to detect changes in stylus proximity to the location sensor 14.

Figure 6:
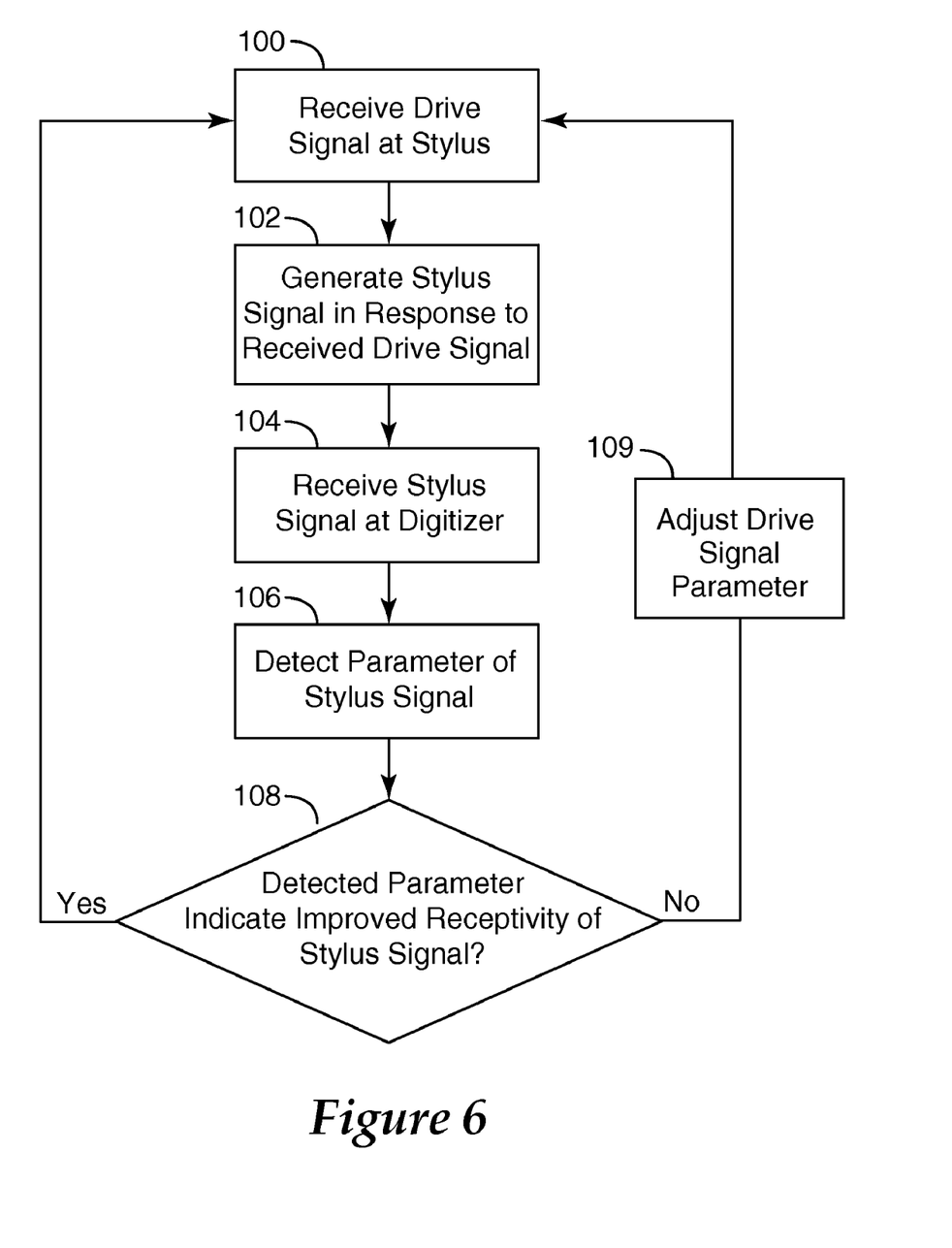
FIG. 6 illustrates a method of improving the receptivity of a stylus signal in response to adjustments made to one or more parameters of a drive signal in accordance with embodiments of the present invention.
Figure 7:
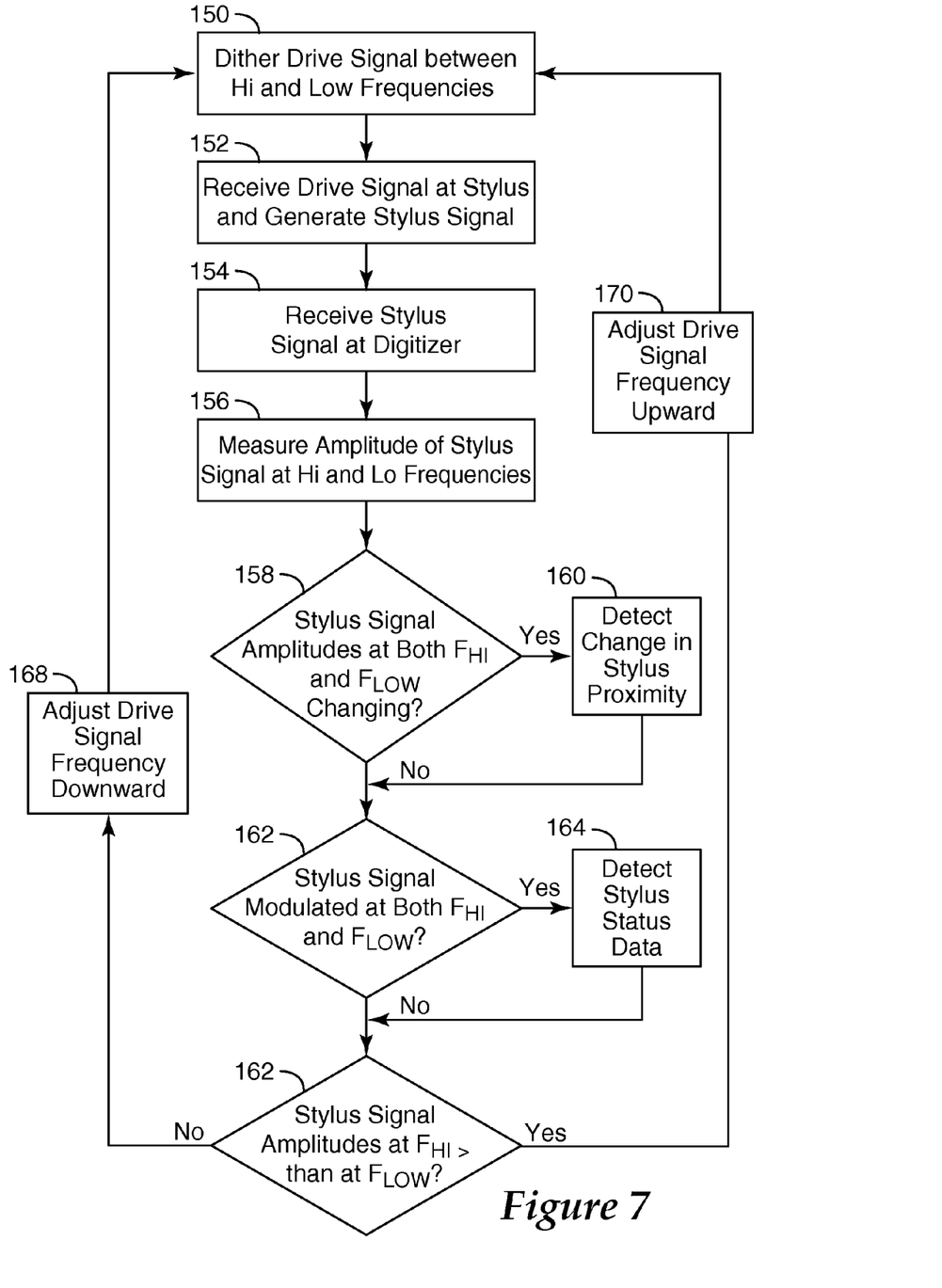
FIG. 7 illustrates a method of improving the receptivity of a stylus signal in response to adjustments made to one or more parameters of a drive signal in accordance with other embodiments of the present invention.

Turning now to FIGS. 6 and 7, there is illustrated methods of improving the receptivity of a stylus signal in response to adjustments made to one or more parameters of the drive signal. FIG. 6 illustrates a general method of improving the receptivity of a stylus signal in accordance with embodiments of the present invention. As is shown in FIG. 6, a drive signal generated by a location sensor is received 100 at the stylus, and is used to provide power for various electronic components of the stylus. In response to drive signal reception, the stylus generates 102 a stylus signal, which is received 104 by the location sensor, such as a digitizer. The stylus signal may include content associated with stylus status, such as the status of one or more mouse buttons of the stylus.

One or more parameters of the stylus signal are detected 106 at the location sensor, and analyzed 108 to determine if an improvement in stylus signal receptivity has been achieved. If so, the processes of FIG. 6 are repeated. If not, one or more parameters of the drive signal produced by the location sensor are adjusted 109 in a manner that is expected to improve a characteristic of the stylus signal that improves stylus signal receptivity.

For example, a parameter of the drive signal may be adjusted 109 to increase a magnitude of the stylus signal, modify a phase of the stylus signal, or increase a signal-to-noise ratio of the stylus signal. A parameter of the stylus signal, such as magnitude or phase, may be measured as the drive signal parameter is adjusted over a range of parameter values. A frequency of the drive signal may be adjusted to match or track a resonance frequency of frequency-sensitive circuitry of the stylus.

FIG. 7 illustrates another approach to improving the receptivity of a stylus signal in accordance with embodiments of the present invention. As is shown in FIG. 7, a drive signal is adjusted (e.g., dithered) 150 between two frequencies, referred to as Hi and Low frequencies. These two frequencies are preferably selected to define frequencies above and below the typical resonance frequency of the stylus resonant circuit, although this is not a requirement. For example, the drive signal may be switched back and forth between two frequencies that are 1% above and below the typical resonance frequency of the stylus resonant circuit.

The drive signal is received 152 at the stylus which, in response, generates a stylus signal. The stylus signal is received 154 at the location sensor, such as a digitizer. Stylus signal amplitude is measured 156 at each of the Hi and Low frequencies.

If the absolute amplitudes of the stylus signal at both the Hi and Low frequencies are found to be changing, such as over a period of greater than a few milliseconds, as tested at decision block 158, then a change in stylus proximity relative to the digitizer is detected 160. If the stylus signal is determined to be modulated at both the Hi and Low frequencies, as tested a decision block 162, then stylus status data is detected 164. For example, if the magnitudes of both Hi and Low frequency stylus signals are modulated in a predetermined frequency or code sequence, this predetermined modulation pattern can be interpreted as a stylus status indicator.

If, as tested at decision block 166, the amplitude of the higher frequency signal is larger than the amplitude of the lower frequency signal, the drive frequency is increased incrementally 170. If the amplitude of the lower frequency signal is larger than the amplitude of the higher frequency signal, the drive frequency is reduced incrementally 168. In this manner, the drive frequency tracks the resonance frequency of the stylus.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A location sensor system, comprising:
an untethered stylus comprising circuitry configured to receive a drive signal and transmit a stylus signal, the circuitry configured to be energized by the received drive signal and comprising frequency-sensitive circuitry; and
a location sensor comprising a controller and sensing array, the location sensor configured to generate the drive signal and receive the stylus signal, the controller configured to adjust a parameter of the drive signal that improves receptivity of the stylus signal by the location sensor; wherein
the controller is configured to:
adjust the frequency of the drive signal to switch back and forth between frequencies higher and lower than an estimated resonance frequency of the frequency-sensitive circuitry;
determine a magnitude of the stylus signal at each of the adjusted drive signal frequencies; and
adjust the drive signal frequency in a manner that increases the stylus signal magnitude.

2. The system of claim 1, wherein the controller is configured to adjust a parameter of the drive signal that increases a magnitude of the stylus signal.

3. The system of claim 1, wherein the controller is configured to adjust a parameter of the drive signal that modifies a phase of the stylus signal.

4. The system of claim 1, wherein the controller is configured to adjust a parameter of the drive signal that increases a signal-to-noise ratio of the stylus signal.

5. The system of claim 1, wherein the controller is configured to measure a parameter of the stylus signal as the drive signal parameter is adjusted over a range of parameter values.

6. The system of claim 5, wherein the stylus signal parameter is a magnitude of the stylus signal.

7. The system of claim 5, wherein the stylus signal parameter is a phase of the stylus signal.

8. The system of claim 1, wherein the controller is configured to adjust a frequency of the drive signal to match a resonance frequency of the frequency-sensitive circuitry of the stylus.

9. The system of claim 1, wherein the controller is configured to adjust a frequency of the drive signal to track changes of a resonance frequency of the frequency-sensitive circuitry of the stylus.

10. The system of claim 1, wherein the controller is configured to:
determine a location of the stylus relative to the sensing array based on absolute values of stylus signal magnitudes at both higher and lower frequencies.

11. The system of claim 1, wherein the stylus circuitry is configured to modulate the magnitude of the stylus signals at the higher and lower frequencies in a predetermined frequency or code sequence, and the controller further configured to demodulate the predetermined frequency or code sequence as a stylus status indication.

12. The system of claim 1, wherein a resonance frequency of the frequency-sensitive circuitry of the stylus changes in accordance with a status change of the stylus, and the controller is configured to detect the change in stylus status by measuring a change of the drive signal frequency needed to match the resonance frequency of the frequency-sensitive circuitry.

13. The system of claim 12, wherein the controller is configured to detect the change in stylus status by measuring a rate of change of the drive signal frequency.

14. The system of claim 1, wherein the stylus comprises switch circuitry coupled to the frequency-sensitive circuitry and comprising one or more switches actuatable by a user of the stylus, a resonance frequency of the frequency-sensitive circuitry changing in response to actuation of the one or more switches, and the controller configured to adjust a frequency of the drive signal to match the changed resonance frequency of the frequency-sensitive circuitry.

15. The system of claim 14, wherein the one or more switches correspond to one or more of a user-initiateable function, a mouse function, a stylus pressure measurement, and a stylus tip switch function.

16. The system of claim 1, wherein the location sensor comprises:
a modulator configured to modulate the drive signal at a drive signal frequency corresponding to a resonance frequency of the frequency-sensitive circuitry of the stylus; and a demodulator that is synchronized with the drive signal frequency.

17. The system of claim 1, wherein the controller is configured to coordinate simultaneous transmission of the drive signal and reception of stylus signal.

18. A method of controlling an operating frequency of a location sensor with an untethered stylus, comprising:
receiving, at the stylus, a drive signal generated at the location sensor;
energizing the stylus and producing a signal at the stylus in response to receiving the drive signal;
receiving the stylus signal at the location sensor; and
adjusting a parameter of the drive signal that improves receptivity of the stylus signal at the location sensor; wherein
adjusting the parameter of the drive signal comprises:
adjusting the frequency of the drive signal to switch back and forth between frequencies higher and lower than an estimated resonance frequency of frequency-sensitive circuitry of the stylus;
determining a magnitude of the stylus signal at each of the adjusted drive signal frequencies; and
adjusting the drive signal frequency in a manner that increases the stylus signal magnitude.

19. The method of claim 18, wherein adjusting the parameter of the drive signal increases a magnitude of the stylus signal.

20. The method of claim 18, wherein adjusting the parameter of the drive signal modifies a phase of the stylus signal.

21. The method of claim 18, wherein adjusting the parameter of the drive signal increases a signal-to-noise ratio of the stylus signal.

22. The method of claim 18, further comprising measuring a parameter of the stylus signal as the drive signal parameter is adjusted over a range of parameter values, the stylus signal parameter comprising at least one of a magnitude of the stylus signal and a phase of the stylus signal.

23. The method of claim 18, wherein adjusting the parameter of the drive signal comprises adjusting a frequency of the drive signal to match a resonance frequency of frequency-sensitive circuitry of the stylus.

24. The method of claim 18, wherein adjusting the parameter of the drive signal comprises tracking changes of a resonance frequency of frequency-sensitive circuitry of the stylus.

25. The method of claim 18, wherein adjusting the parameter of the drive signal comprises:
determining a location of the stylus relative to the location sensor based on absolute values of stylus signal magnitudes at both higher and lower frequencies.

26. The method of claim 18, wherein adjusting the parameter of the drive signal comprises:
modulating the magnitude of the stylus signals at the higher and lower frequencies in a predetermined frequency or code sequence; and
demodulating, at the location sensor, the predetermined frequency or code sequence as a stylus status indication.

27. The method of claim 18, further comprising:
changing a resonance frequency of frequency-sensitive circuitry of the stylus in accordance with a status change of the stylus; and
detecting, at the location sensor, the change in stylus status by measuring one or both of a change and a rate of change of the drive signal frequency needed to match the resonance frequency of the frequency-sensitive circuitry of the stylus.

28. The method of claim 18, wherein transmitting the drive signal and receiving the stylus signal at the location sensor are effected simultaneously.

* * * * *